Figure 1:
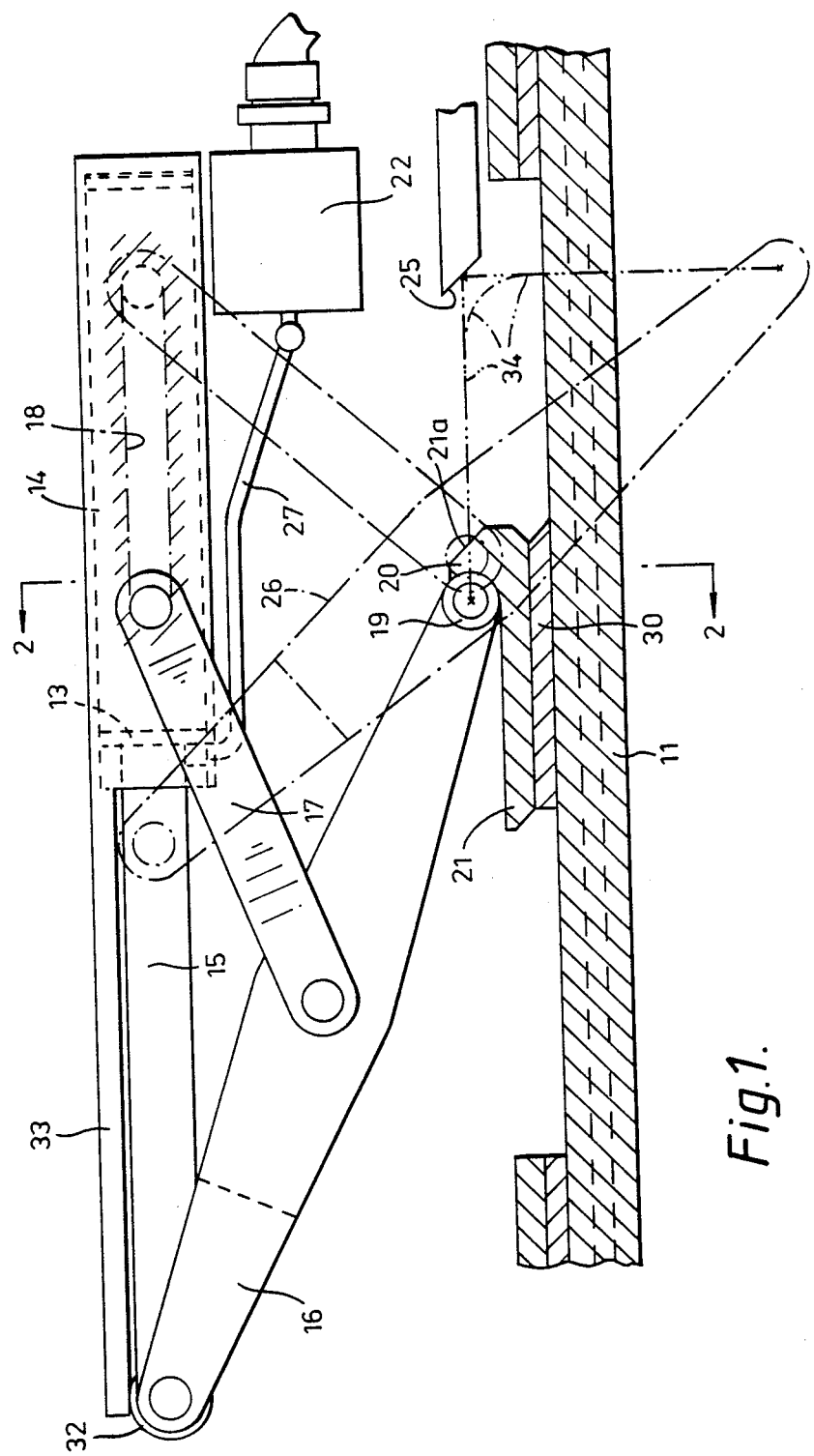

United States Patent [19]

Griffin et al.

[11] Patent Number: 4,802,400
[45] Date of Patent: Feb. 7, 1989

[54] AIR-CARRIED MISSLE LAUNCHER

[75] Inventors: Dennis Griffin, Guildford; Ronald F. Delves, Fordingbridge, both of England

[73] Assignee: Frazer-Nash Limited, England

[21] Appl. No.: 36,320

[22] Filed: Apr. 9, 1987

[30] Foreign Application Priority Data

Apr. 9, 1986 [GB] United Kingdom ................ 8608668

[51] Int. Cl.$^4$ .............................................. F41F 3/06
[52] U.S. Cl. ................................... 89/1.57; 89/1.815;
89/1.819; 244/137.4
[58] Field of Search ................... 89/1.57, 1.819, 1.815,
89/1.51; 244/137.4

[56] References Cited

U.S. PATENT DOCUMENTS

| 3,040,629 | 6/1962 | Duncan et al. | 89/1.819 |
| 3,273,459 | 9/1966 | Lardin | 244/137.4 |
| 3,771,416 | 11/1973 | Ackerman et al. | 244/137.4 |
| 4,660,456 | 4/1987 | Griffin et al. | 89/1.819 |
| 4,669,356 | 6/1987 | Griffin et al. | 89/1.57 |
| 4,685,377 | 8/1987 | Mace et al. | 89/1.51 |
| 4,711,151 | 12/1987 | Griffin et al. | 89/1.805 |

FOREIGN PATENT DOCUMENTS 3016925 11/1981 Fed. Rep. of Germany .
1493288 8/1967 France ................... 89/1.51

Primary Examiner—David H. Brown
Attorney, Agent, or Firm—Hall, Myers & Rose

[57] ABSTRACT

A missile launcher is provided with pyrotechnically-operated means for jettisoning the missile. The missile is hung under a sub-rail latched to the underside of the main launcher body and upon operation of the jettisoning means the sub-rail/missile combination is slid rearwardly to disengage the latches after which the combination is given a downward thrust away from the launcher body, the thrust being imparted just forward of the collective center of gravity of the missile/launcher combination to cause its downward departure to be assisted by negative lift. The jettisoning means may consist of a lever and linkage actuated by a gas-operated piston-and-cylinder.

14 Claims, 2 Drawing Sheets

AIR-CARRIED MISSILE LAUNCHER

This invention relates to airborne missile launchers.

Whereas it is desirable that pilots should have available the option to jettison missiles in an emergency, the only ways currently to jettison a missile are:

(a) jettison of the entire launcher with the missile if the missile is carried on an ejector release unit (E.R.U.).

(b) ignition of the missile rocket motor to effect an untargeted launch if the launcher is not on an E.R.U.

Both of these methods have major disadvantages such as in the case of (a), loss of a valuable launcher, centre of gravity problems giving rise to dangerous jettison trajectories, low separation velocity due to the launcher and missile's combined mass, and poor aerodynamic behaviour of the combination after launch. Most significantly, method a) is not possible at all if the missile is not carried on an E.R.U. In the case of (b), the hazard of an unguided missile is obvious, and with certain missiles the weapon is incapable of being launched unarmed and inactive.

It is therefore an object of this invention to achieve an alternative jettison option.

According to the present invention, in an airborne missile launcher the missile is carried on a sub-rail detachably secured to the underside of the main launcher body, and a jettisoning mechanism is provided operable to detach the sub-rail from the launcher body and eject it downward together with the missile. In a preferred form, by incorporating in the launcher a mechanism which is pyrotechnically operated in emergency jettison conditions such that it first withdraws the rail latch, then forces the rail (and missile) rearwards to disengage the rail/launcher body connection and thereafter thrusts downward on the rail, rail separation complete with the missile can be effected.

Figure 2:
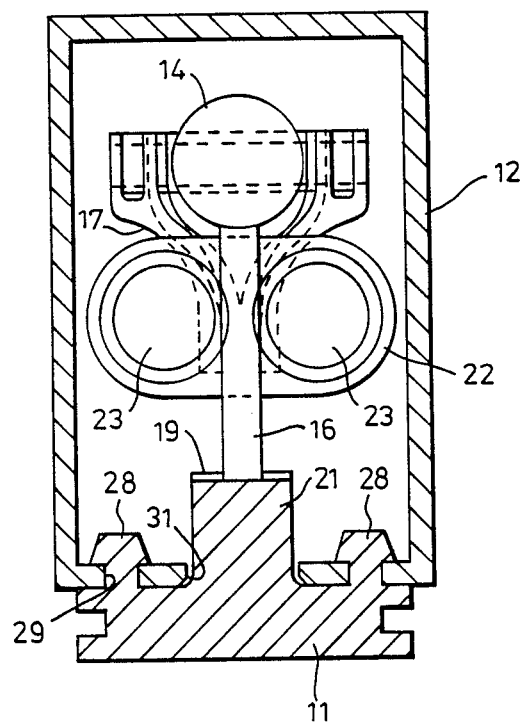

An arrangement in accordance with the invention will now be described by way of example and with reference to the accompanying drawings, in which:

FIG. 1 is a cross-sectional elevation of part of a missile launcher according to the invention, and FIG. 2 is a view in section on the line 2—2 of FIG. 1.

The drawings show a missile launcher in which the missile (not shown) is carried on a sub-rail 11 mounted under the main body 12 of the launcher, such as described in our patent specifications Nos. EP0136917 and GB2166526, by means of lugs 28 the stems of which pass up through slots 29 in the underneath wall of the main body 12. The launcher is modified by the inclusion of the jettisoning mechanism for separating the sub-rail 11 and missile from the launcher body 12.

The mechanism within the main launcher body 12 comprises a gas-powered piston 13 operating in a horizontal cylinder 14 and having a forwardly-extending piston rod 15 pivotally connected at its forward end to the bifurcated upper forward end of an inclined driving strut 16. Links 17 each have one end pivotally connected to the driving strut 16 midway along the strut while their other ends are guided to travel horizontally in guideways 18 along the sides of the cylinder 14.

A roller foot 19 at the lower rearward end of the driving strut 16 bears rearwardly against an upstanding abutment 20 on a central longitudinal top rib 21 of the sub-rail 11 that extends up through a central slot 31 in the underneath wall 30 of the main launcher body 12.

When the driving strut 16 is driven rearwardly by the admission of gas pressure to the forward end of the cylinder 14 via a pipe 27 from the breech of a pyrotechnic cartridge system 22, having duplicated gas cartridges 23 for reliability, the sub-rail 11 with the missile is slid in the rearward direction a sufficient distance to disengage the sub-rail from the launcher body 12, by reason of the lugs 28 arriving at locations where there are gaps in the underneath wall 30 of the launcher body through which the lugs can pass. At this time, inclined cam or abutment faces on the sub-rail, one of which is shown at 21a on the back of the abutment 20, engage co-operating inclined cam or stop faces on the launcher body, one of which is shown at 25, to impart a downward velocity to the sub-rail and missile.

Simultaneously, the linkage 17, which is now constrained to exert a downward force on the rail 11 by virtue of its upper end reaching the limit of horizontal travel permitted by the guideways 18, continues to be operated by the gas piston 13 such that the rail is ejected downwards, the driving strut 16 eventually reaching the position shown in broken lines at 26, with the roller 19 following the path indicated at 34. In order to relieve the bending moment on the piston rod 15, a roller 32 at the upper forward end of the driving strut 16 runs horizontally along a thrust bar 33, extending from the cylinder 14, during the piston stroke.

The arrangement is designed so as to provide the downward force at a position on the rail/missile combination slightly forward of the collective centre of gravity. The missile is thereby subjected to a nose down pitching moment in addition to the downward vertical thrust, and in consequence separation from the aircraft is assisted by aerodynamic forces in the form of negative lift.

The arrangement described thus provides a means of safely jettisoning, in an inactive condition, air-carried missiles, in a manner not possible with conventional rail launchers. It is an important added advantage of the design of rail launcher featured in our aforementioned patent specifications, which employs a detachable rail, selectable to interface with different types of missiles.

The mechanism for pyrotechnically imparting first rearward then downward motion to the launch rail and its missile is simple, and it can be produced as a module, which can be fitted in the launcher as circumstances require.

We claim:

1. An airborne missile launcher, comprising:
a main missile launcher,
a sub-rail for detachable attachment of a missile,
detachable connection means for detachably connecting said sub-rail to said launcher,
jettison means for disconnecting and jettisoning said sub-rail from said launcher,
actuating means for actuating said jettison means where actuating said jettison means causes detachment of said connection means and disconnects and jettisons said sub-rail from said launcher.

2. A launcher according to claim 1, where said actuating means is pyrotechnic means.

3. A launcher according to claim 1 or claim 2, where said detachable connection means is a latch and said jettisoning means is arranged to slide the sub-rail longitudinally for disconnecting said latch and further including thrust means for imparting a downward thrust to the sub-rail.

4. A launcher according to claim 3, where a missile is secured to the sub-rail and said jettisoning means is said thrust means which is arranged to impart the downward thrust to the sub-rail at a position a short distance forward of the collective center of gravity of the sub-rail combined with the missile.

5. A launcher according to claim 1, where the jettisoning means comprises a gas-operated piston-and-cylinder and the launcher further comprises a lever including an upper end and a lower end, a linkage upon which said jettison means acts, and an abutment on said sub-rail, whereupon actuation of said jettisoning means causes said lever to thrust first rearwardly and then downwardly on the sub-rail.

6. A launcher according to claim 5, where the piston-and-cylinder is disposed horizontally and is coupled to the upper end of said lever, said lever is inclined rearwardly and downwardly with its lower end in engagement with said abutment on the sub-rail, said linkage has a lower end pivotally connected to a point on the lever intermediate the lever ends, and said linkage extends upwardly and rearwardly from said pivotal connection to the lever.

7. A launcher according to claim 6 further including guide means for constraining movement of the upper lever to slide horizontally and rearwardly.

8. A launcher according to claim 7, wherein said linkage and guide means are arranged such that the rearwardly sliding upper end of the linkage reaches the end of the guide means and is arrested before the end of the piston stroke of the piston-and-cylinder, whereby during the portion of the piston stroke occurring after arrest of the upper end of the linkage the lower end of the lever thrusts downward on the sub-rail.

9. A launcher according to claim 8, where the detachable connection means between the main launcher and the sub-rail is arranged such that the sub-rail slides rearwardly during the portion of the stroke of the piston-and-cylinder of the jettisoning means while the upper end of the linkage is sliding rearwardly which causes said connection means to detach from said launcher so that the sub-rail is clear to fall away from the launcher.

10. A launcher according to claim 9, further comprising co-operating inclined abutment faces on the sub-rail and the main launcher which come into mutual engagement at the limit of rearward sliding of the sub-rail thereby to cause a camming action imparting a downward thrust to the sub-rail.

11. An improved missile launcher of the type including a main launcher and a detachable sub-rail, the improvement comprising:
 a detachable connection member for detachably attaching the sub-rail to the main launcher,
 a jettison means for jettisoning the sub-rail from the launcher, and
 an actuator means for actuating the jettison means to detach the sub-rail from the launcher.

12. An improved missile launcher according to claim 11 where said detachable connection means is a latch and said jettisoning means is arranged to slide the sub-rail longitudinally for disconnecting said latch and further including thrust means for imparting a downward thrust to the sub-rail.

13. A launcher according to claim 11 where the jettisoning means comprises a gas-operated piston-and-cylinder and the launcher further comprises a lever including an upper end and a lower end, a linkage upon which said jettison means acts, and an abutment on said sub-rail, whereupon actuation of said jettisoning means causes said lever to thrust first rearwardly and then downwardly on the sub-rail.

14. A launcher according to claim 13 where the detachable connection means between the main launcher and the sub-rail is arranged such that the sub-rail slides rearwardly during the portion of the stroke of the piston-and-cylinder of the jettisoning means while the upper end of the linkage is sliding rearwardly which causes said connection means to detach from said launcher so that the sub-rail is clear to fall away from the launcher.

* * * * *

UNITED STATES PATENT AND TRADEMARK OFFICE
CERTIFICATE OF CORRECTION

PATENT NO. : 4,802,400

DATED : February 7, 1989

INVENTOR(S) : Dennis Griffin and Ronald F. Delves

It is certified that error appears in the above-identified patent and that said Letters Patent is hereby corrected as shown below:

Cover page, in the title: change "Missle" to --Missile--

Signed and Sealed this

Twenty-sixth Day of September, 1989

Attest:

DONALD J. QUIGG

Attesting Officer

Commissioner of Patents and Trademarks